(12) United States Patent
Gallardo et al.

(10) Patent No.: US 7,963,567 B2
(45) Date of Patent: Jun. 21, 2011

(54) ANTI-ROTATION PIPE LOCATOR AND HOLDER

(75) Inventors: Luis Gallardo, Vista, CA (US); Larry D. Brown, San Diego, CA (US); Dennis Hart, Incline Village, NV (US)

(73) Assignee: Securus, Inc., Vista, CA (US)

( * ) Notice: Subject to any disclaimer, the term of this patent is extended or adjusted under 35 U.S.C. 154(b) by 355 days.

(21) Appl. No.: 12/109,603

(22) Filed: Apr. 25, 2008

(65) Prior Publication Data
US 2008/0265571 A1    Oct. 30, 2008

Related U.S. Application Data

(60) Provisional application No. 60/926,546, filed on Apr. 27, 2007.

(51) Int. Cl.
*F16L 3/04*    (2006.01)
(52) U.S. Cl. ............... 285/140.1; 285/139.1; 285/139.3; 285/322
(58) Field of Classification Search ............... 285/139.1, 285/139.3, 140.1, 322, 324, 154.1
See application file for complete search history.

(56) References Cited

U.S. PATENT DOCUMENTS

| | | | | |
|---|---|---|---|---|
| 2,514,504 | A * | 7/1950 | Moline ..................... | 285/140.1 |
| 3,009,167 | A | 11/1961 | Leonard, Jr. | |
| 3,481,571 | A | 12/1969 | Lauckner | |
| 3,866,871 | A | 2/1975 | Dupuy, Sr. | |
| 4,145,075 | A * | 3/1979 | Holzmann ................... | 285/322 |
| 4,225,162 | A * | 9/1980 | Dola ......................... | 285/139.1 |
| 4,234,218 | A * | 11/1980 | Rogers ....................... | 285/139.1 |
| 4,441,744 | A * | 4/1984 | Oostenbrink et al. ...... | 285/140.1 |
| 4,462,620 | A * | 7/1984 | Bambenek et al. ........ | 285/140.1 |
| 4,550,451 | A | 11/1985 | Hubbard | |
| 4,765,960 | A * | 8/1988 | Urata et al. ................ | 285/140.1 |
| 4,907,766 | A | 3/1990 | Rinderer | |
| 5,050,824 | A | 9/1991 | Hubbard | |
| 5,154,375 | A | 10/1992 | Condon | |
| 5,290,071 | A * | 3/1994 | Rider et al. ................ | 285/139.1 |
| 5,405,172 | A * | 4/1995 | Mullen, Jr. ................ | 285/139.1 |
| 5,799,988 | A * | 9/1998 | Yeh ........................... | 285/139.1 |
| 5,927,892 | A * | 7/1999 | Teh-Tsung .................. | 285/322 |
| 6,082,782 | A * | 7/2000 | Bartholoma et al. ...... | 285/140.1 |
| 6,158,066 | A | 12/2000 | Brown et al. | |
| 6,179,340 | B1 * | 1/2001 | Adolf et al. ................ | 285/140.1 |
| 6,511,099 | B2 * | 1/2003 | Bartholoma et al. ...... | 285/140.1 |

(Continued)

*Primary Examiner* — David E Bochna
(74) *Attorney, Agent, or Firm* — Stetina Brunda Garred & Brucker; Lowell Anderson

(57) ABSTRACT

A plumbing strap is fastened to a building. A tubular insert is placed through a hole in a strap with posts on the tubular insert aligning with cut-outs in the strap to restrict rotation of the tubular insert relative to the strap. A flange on one end of the tubular insert abuts the strap to restrict longitudinal motion of the tubular insert. Latches on the tubular insert extend through the hole in the strap to engage the side of the strap opposite the flange and further restrict longitudinal movement of the tubular insert. A collar is placed over the tubular insert and a pipe extends through the tubular insert and collar. The tubular insert has a base adjacent the flange and a skirt distal from the flange. Longitudinal slits in the base and skirt define resilient members in the base and in the skirt that extend in opposing directions, but that can move inward. The collar screws onto the tubular insert causing abutting surfaces on the collar and on the resilient members to force the resilient members inward to grip the pipe and restrain longitudinal and rotational movement of the pipe relative to the tubular insert and strap.

29 Claims, 12 Drawing Sheets

U.S. PATENT DOCUMENTS

| | | | |
|---|---|---|---|
| 6,722,704 B2 * | 4/2004 | Bartholoma et al. | 285/140.1 |
| 7,090,257 B2 * | 8/2006 | Werth | 285/322 |
| 7,325,838 B2 * | 2/2008 | Gardner et al. | 285/140.1 |
| 7,563,993 B2 * | 7/2009 | Drotleff et al. | 285/322 |

* cited by examiner

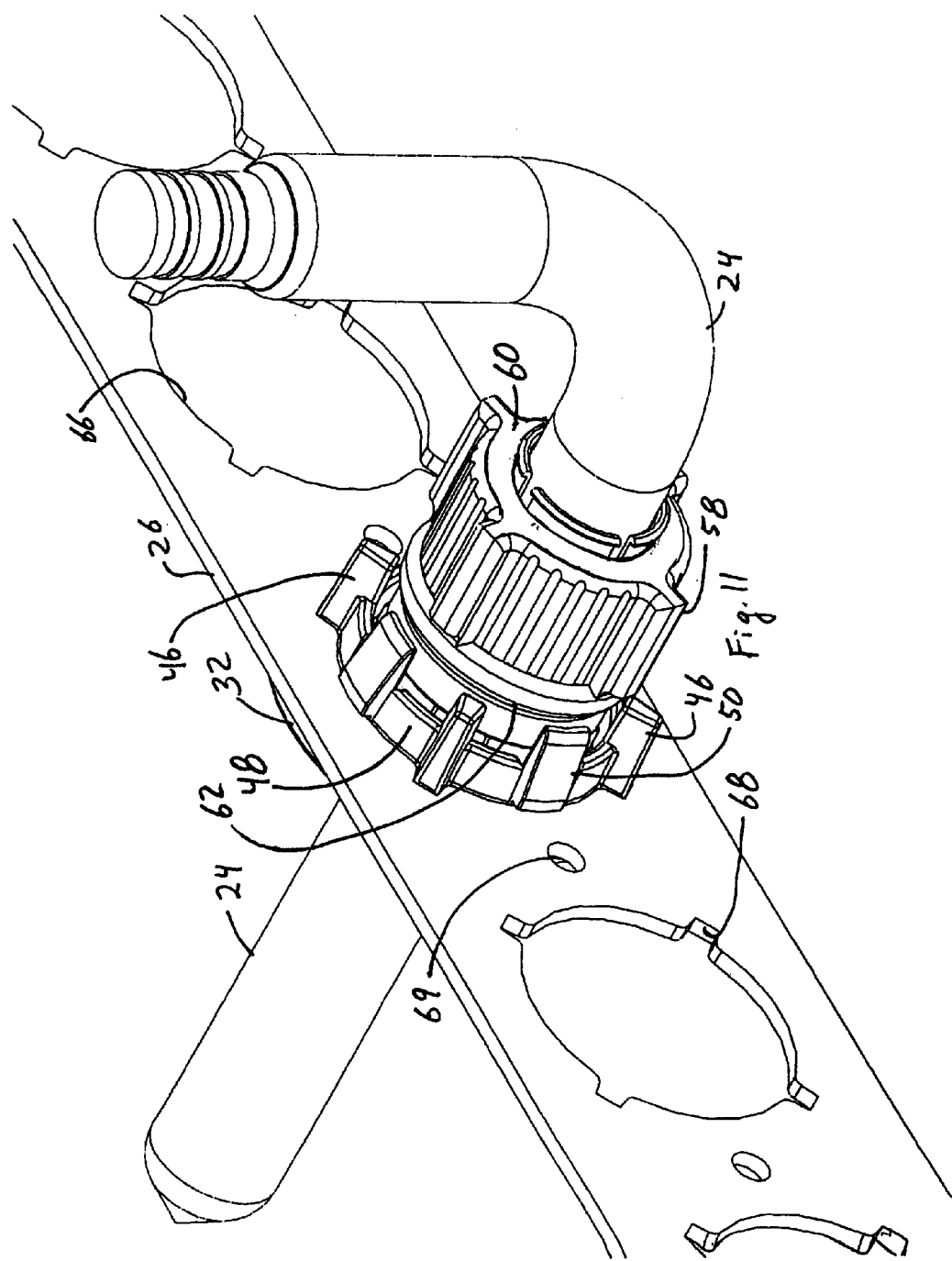

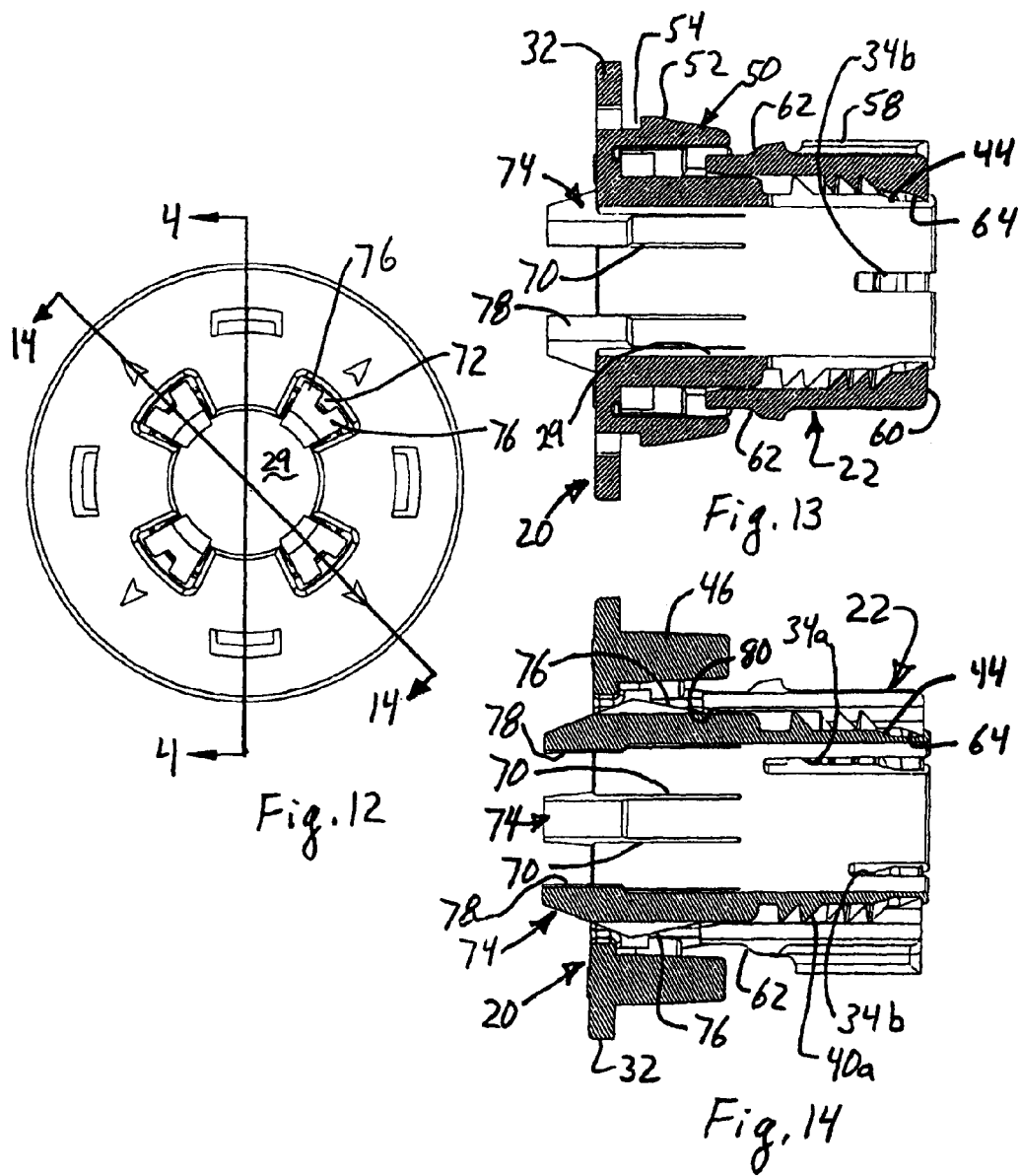

ANTI-ROTATION PIPE LOCATOR AND HOLDER

CROSS-REFERENCE TO RELATED APPLICATIONS

This application claims the benefit under 35 U.S.C. §119 (e), of application Ser. No. 60/926,546, filed Apr. 27, 2007, the entire contents of which are incorporated herein by reference.

BACKGROUND

Pipes adapted to mate with a plumbing fixture such as a sink or the like typically extend upwardly between building studs and project laterally from the building's wall for connection to the plumbing fixture through fixture inlets such as shut-off valves. The pipes are preferably secured in place to prevent axial movement parallel to the pipes, rotation around the pipes, vertical movement upwardly and downwardly, and lateral movement sideways during use. The pipes are also preferably located a predetermined distance apart from each other for precise alignment with fixture inlets that are typically pre-formed in the plumbing fixtures.

Traditional methods of securing pipes between studs use complex hardware such as bolted elbows, threaded fittings, universal supporting bars, or anti-rotation inserts placed into such supporting bars or plumbing straps. As a result, a plumber must manipulate specialized fasteners or the like to attach specialized fittings to building studs or similar structures to hold the pipes in place. Additionally, many methods involve the use of solder and hot appliances and open flames such as torches which introduce extra steps, hazards and liabilities into the process.

But these prior art devices can be difficult to install, and may not adequately restrain movement along the length of the pipe. Restraining movement along the length of the pipe can be problematic because the pipe is typically held adjacent an elbow or 90° bend such as typically occurs when pipes extend along a wall and then outward to connect to a sink, tub, shower etc., and there is little room between the elbow and the wall within which to fit an apparatus that adequately restrains the desired movements of the pipe. There is thus a need for a method and apparatus to hold pipes in position while restraining axial movement along the length of the pipe, to restrain lateral movement of the pipe, and to do so in the small space between the elbow and the typical wall, and to do so easily, quickly and with minimal additional preliminary equipment.

BRIEF SUMMARY

Very briefly described, a plumbing strap is fastened to a building. A tubular insert is placed through a hole in a strap with one or more posts on the tubular insert aligning with cut-outs in the periphery of the opening to restrict rotation of the tubular insert relative to the strap. A flange on one end of the tubular insert abuts the strap to restrict longitudinal motion of the tubular insert. Latches on the tubular insert extend through the hole in the strap to engage the side of the strap opposite a flange and further restrict longitudinal movement of the tubular insert. A collar is placed over the distal end of the tubular insert and a pipe extends through the tubular insert and collar. The tubular insert has a base adjacent the flange and a skirt distal from the flange. Longitudinal slits in the base and skirt define resilient members in the base and in the skirt that extends from about the middle of the tubular insert but in opposing directions, to separate the members from the tubular insert so the members can move inward. The collar screws onto the tubular insert causing abutting surfaces on the collar and on the resilient members to force the resilient members inward to grip the pipe and restrain longitudinal and rotational movement of the pipe relative to the tubular insert and strap.

In more detail, a strap or bracket support structure is provided that is fastenable to a building structure. The strap has one or more openings. Typically, plural openings are provided that are spaced at preset distances. Each of the strap openings optionally has a slot or cut-out extending from an edge of the opening outward from the opening, and preferably has four such slots or cut-outs.

A tubular insert is placed through the opening in the strap or other support structure fastened to the building. The tubular insert has a flange that abuts the strap or structure and a tubular skirt extending through the hole in the strap along a length of the pipe held by the tubular insert. The tubular insert optionally has at least one post or stop, and preferably has a plurality of posts that each fit into one of the slots or cut-outs to restrain rotation of the tubular insert in the plane of the flange and strap.

The base and skirt are both tubular and both are generally perpendicular to the flange. The flange prevents the tubular insert from passing through the hole in the strap, while resilient portions of the skirt can be moved to hold the pipe, tube or other conduit. The posts are generally parallel to the skirt and base, are located radially outward of the base and preferably do not extend as far as the skirt.

The flange abuts the strap to prevent longitudinal movement along one axis, and latches are provided that extend through the hole in the strap through which the tubular insert is installed in order to engage the opposing side of the strap to restrain movement in the opposing axial direction. The latches preferably have a stepped or barbed portion located to engage the side of the strap opposite the flange to further restrain the tubular insert from being removed from the hole in the strap. The latches are advantageously flexible enough so the distal end of each latch bends inward toward the longitudinal axis of the tubular insert as the latches slide through the hole in the strap and then extend outward so the stepped or barbed portion engages the strap. Manually moving the distal ends of the latches inward disengages the stepped or barbed portions and allows removal of the latches and tubular insert from the strap.

The skirt is tubular so the pipe fits through the skirt. The skirt is threaded on its outside and is also slit along its length (i.e., parallel to the axis of the pipe) to form a collet having a plurality of resilient members that can be moved inward toward the pipe. The resilient members extend from the skirt toward the distal end of the skirt. A threaded collar fits over the distal end of the tubular insert so that it surrounds the slit portion of the skirt and is movable in an axial direction to engage the threaded portion of the skirt. A narrowing diameter or ramp on the collar squeezes these resilient members in the skirt inward to grip and hold the pipe as the threaded collar is tightened on the tubular insert. Unscrewing the collar allows the slit portions of the tubular insert to resume their original positions and loosens the frictional grip on the pipe.

Further, on the end of the collar closest to the flange and strap, at least a portion of the end of the collar is preferably sized to fit inside the various projecting posts, walls or latches that extend through the slots or cut-outs. The collar advantageously, but optionally, has a tapered portion extending outwardly, preferably as an enlarging conical portion, that is located to abut the latches and urge them outward and away from the pipe and into engagement with the slots in the strap to further lock the tubular insert to the strap.

Further, the tubular insert optionally has a tubular base interposed between the flange and skirt, with longitudinal slits in the base and alternating circumferential slots or openings through the flange in order to form resilient base members that can move toward the pipe. The resilient base members extend from an area near the skirt toward and preferably slightly beyond the flange, while the resilient skirt members extend in the opposite direction away from the flange. The free ends of the flexible base members optionally have defined contact areas to abut the pipe and advantageously those contact areas are located slightly beyond the flange in order to provide a wide and stable support for the pipe that extends through the tubular insert and collar. Inclined surfaces are placed on one or both of the collar and flexible base members so that movement of the collar toward the flange urges the flexible base members inward toward the pipe.

In use, the tubular insert and collar are slid over the end of a pipe, or at least the tubular insert is slid over the end of the pipe. The tubular insert and optionally the collar are inserted through the hole in the strap. Once installed around the pipe and assembled to the distal end of the tubular insert the collar is tightened so the slit portion of the skirt grips the pipe and prevents movement of the pipe along the axis of the pipe and tubular insert and rotational movement of the pipe relative to the tubular insert. Optionally, tightening the collar also causes the resilient bases members to move inward and grip the pipe at a location distant from the distal end of the skirt. Preferably the collar and resilient members have mating inclined surfaces so axial movement of the collar causes the inward gripping movement of the resilient members. Optionally, tightening the collar also urges the latches outward to further engage the slots or cut-outs in the strap. The collar is loosened if the axial position of the pipe relative to the strap and/or tubular insert needs adjustment. The tubular insert could be installed into the opening in the strap either before or after the pipe is passed through the tubular insert. The collar could be assembled to the tubular insert either before or after the pipe is passed through the tubular insert. Unscrewing the collar allows the pipe to be released and may allow the collar to be removed from the tubular insert. Optionally, the tubular insert and collar may be assembled during manufacture so they are installed in the strap as a unit. Further, the collar can be dimensioned relative to the tubular insert such that the collar can spin freely on the tubular insert without the threads engaging on the tubular insert and collar. Further, cooperating elements may be optionally be fashioned on one or both of the tubular insert or collar to make separation difficult once they have been assembled. Squeezing the ends of the latches inward allows the latches to pass through the hole in the strap so the tubular insert can be removed from the strap.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 11 is an enlarged perspective view of the parts of FIG. 10 but from an opposing angle;

FIG. 12 is an end view of the tubular insert shown in FIG. 1;

FIG. 13 is a sectional view taken along Section 4-4 of FIG. 12 with a sectional view of a collar included; and FIG. 14 is a sectional view taken along Section 14-14 of FIG. 12.

DETAILED DESCRIPTION

Figure 1:
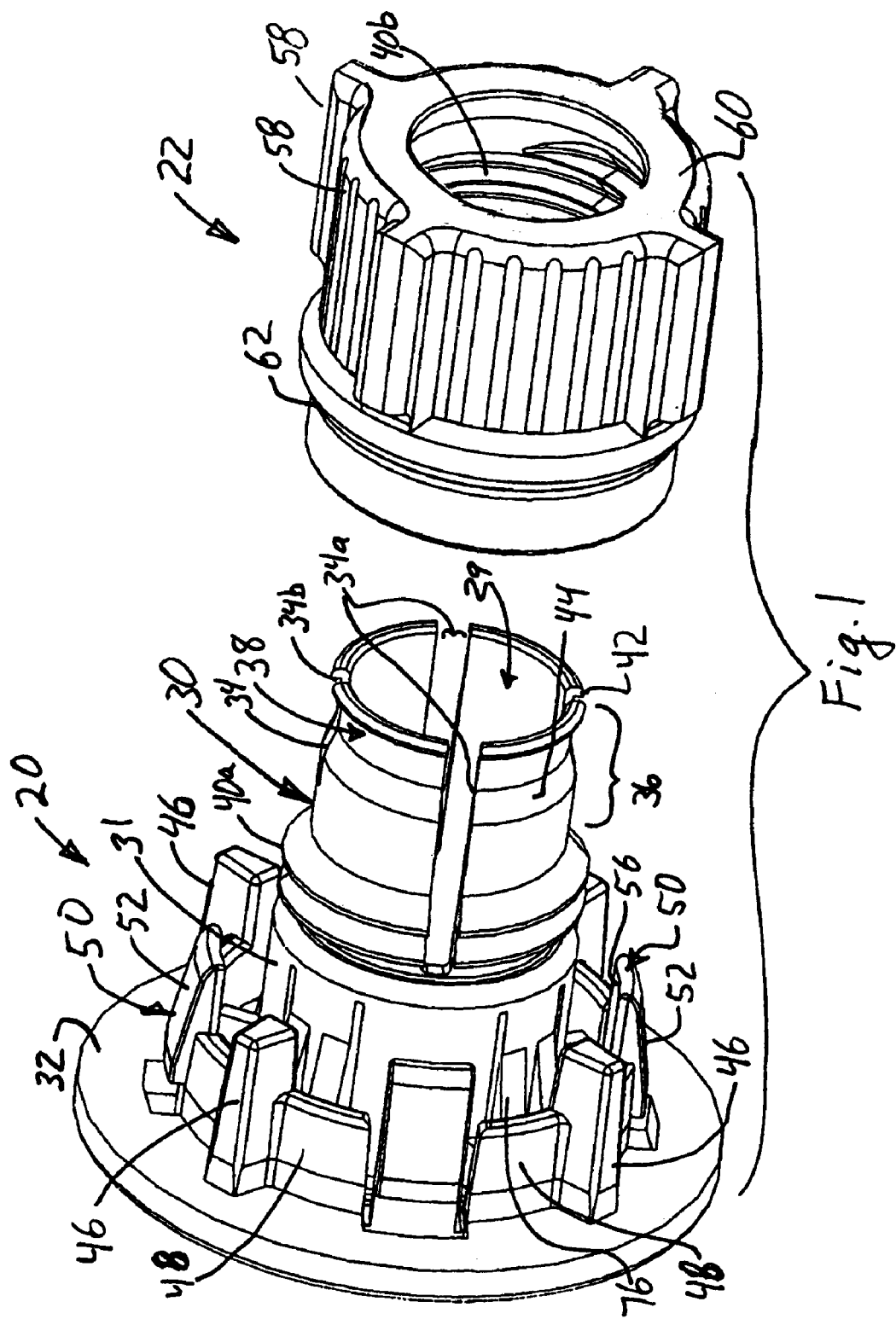
FIG. 1 is an exploded perspective view showing an tubular insert and collar for holding a pipe to a strap.
Figure 4:
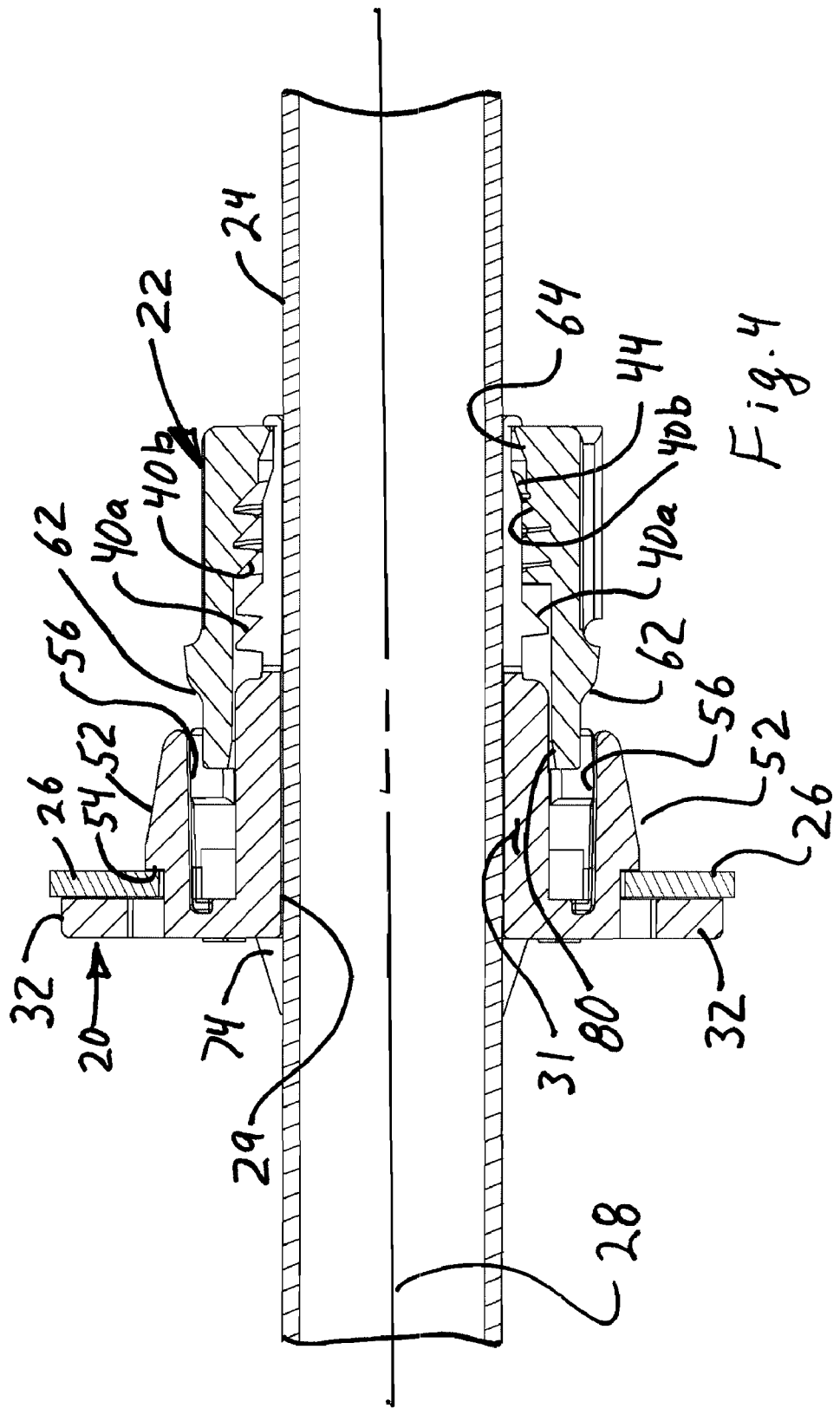
FIG. 4 is a sectional view of the parts of FIG. 1 taken along section 4-4 of FIG. 12 with the parts fit together and a pipe inserted through them.
Figure 5:
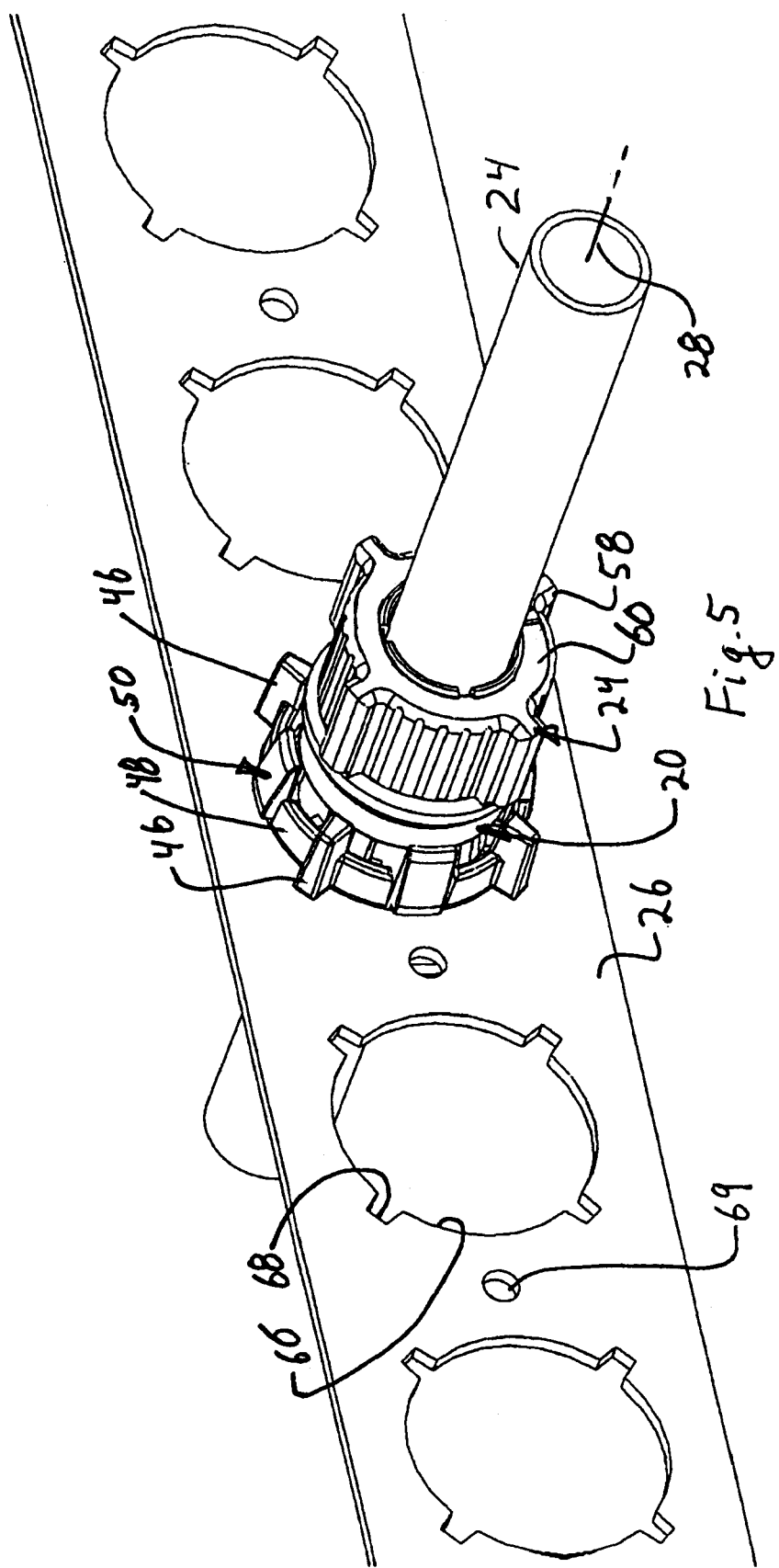
FIG. 5 is a perspective view showing the tubular insert and collar of FIG. 1 fastened to a strap with a pipe held in the tubular insert.

Referring to FIGS. 1-6, and primarily to FIGS. 1 and 4, an tubular insert 20 cooperates with a collar 22 to fasten pipe 24 to a support member, referred to herein as strap 26 that is in turn fastened to a building (not shown). The tubular insert 20 and pipe 24 preferably have a common longitudinal axis 28 when assembled, with the tubular insert having a passage 29 configured to allow passage of the pipe 24. The passage 29 is preferably of the same shape as the pipe and slightly larger than the pipe. Thus, for a cylindrical pipe 24 the passage 29 is also preferably cylindrical, but the shape of passageway 29 could be different, such as square, hexagonal, octagonal or other multi-sided cross-sectional shapes.

The tubular insert 20 has a tubular base 31 and a tubular skirt 30 extending along and encircling the longitudinal axis 28. Flange 32 is connected to the base 31 and generally perpendicular to the base 31 and skirt 30. The flange abuts strap 26 during use. The flange 32 is shown as a continuous, annular flange, but it need not be continuous and could comprise a plurality of outwardly extending segments. As used herein, inward or inner means toward longitudinal axis 28 and outward or outer means away from the axis 28. As used herein, proximal refers to proximity relative to flange 32, and distal refers to the location along axis 28 away from flange 32.

The distal portion of the skirt 30 has slits 34, preferably along the longitudinal length of the skirt and opening onto a distal end of the skirt and tubular insert to form a plurality of flexible skirt members 38. But optionally, the slits 34 are of different lengths with the depicted embodiment showing two long slits 34a opposite each other and two short slits 34b opposite each other, with the slits 34 being equally spaced around the circumference of the skirt. The different length of slits 34 provides for a stronger skirt 30, and also causes the resilient members 38 to bend more at the distal end than adjacent the flange 32 and base 31. The different length slits 34 provide a non-linear bending stiffness of the skirt 30 inward toward the pipe 24, and that also provides for a non-uniform bending of the skirt 30.

Threads 40a are formed on the outer side of the skirt 30 or base 31. Various thread configurations can be used. Preferably the threads 40 are configured with a high pitch so that a large axial motion results from a small rotation, with the threads also being configured to have a large base and large cross-section in order to carry high loads. The threads are preferably square topped threads with an aggressive pitch and a single lead. Alternatively, if it is desirable to require less rotational force, then the threads could be low pitch. Various types of threads can be used.

The distal end of the skirt 30 preferably has an outwardly extending lip 42 that preferably has a rounded or tapered distal end. A first skirt ramp 44 is formed on the outer surface of the skirt 30, preferably between the threads 40a and lip 42. The first skirt ramp 44 inclines inward toward the longitudinal axis and in the direction of the lip 42. The incline of ramp 44 is such that a force parallel to the longitudinal axis 28 urges the flexible skirt member 38 inward toward the longitudinal axis 28.

At least one, and preferably a plurality of stops 46 extend from the flange 32 generally parallel to the axis 28, preferably arranged to encircle that axis. In the depicted embodiment the stops take the form of posts and thus the stops will be referred to as posts 46, although the configuration of the posts can vary. Four posts 46 are shown. The number of posts 46 can vary, and the posts can be omitted entirely. A curved wall 48 extends from opposing sides of the posts 46 and from the flange 32, so the posts can also be viewed as ribs on the walls. The walls 48 also preferably encircle the longitudinal axis 28. The walls 48 are optional, but preferred.

Extending from the flange 32 and generally parallel to the axis 28, and located between two of the posts 46 is a latch 50. The location and configuration of the latches can vary. Preferably there are a plurality of latches 50. The latches 50 have an optional inclined surface or ramp 52 that is inclined toward the longitudinal axis 28 and toward the distal end of the latch 50. The end of the ramp 52 adjacent the flange 32 preferably, but optionally forms an inward step or barb 54. The ramp 52 tapers inward from the barb 52 to the distal end of the ramp which is away from the flange 32. The latches 50 are preferably equally spaced about the longitudinal axis 28 and spaced outward from the skirt 30. The latches 50 have an inward facing surface 56. The distal end of the latches 50 is preferably, but optionally, rounded. The walls 48, posts 46 and latches 50 are preferably arranged to encircle the longitudinal axis, and are spaced outward from base 31. An annular space is preferably formed between the base 31 and the walls 48, posts 46 and latches 50 and the space is preferably large enough to receive a proximal end of the collar 22.

The collar 22 is preferably tubular and sized to fit over the skirt 30. The collar 22 has threads 40b located and configured to mate with threads 40a on the tubular insert 20. Thus, the collar threads 40b mate with the threads 40a on the skirt 30 in the depicted embodiment. The threads 40a, 40b could be located elsewhere on the tubular insert 20 and collar 22.

The collar 22 preferably has an outer surface configured or textured to facilitate manual gripping and rotation. There are optionally a plurality of ribs 58 extending parallel to axis 28 and extending outward from the collar. Preferably not all the ribs 58 are the same size and the depicted embodiment shows four large ribs 58 equally spaced about the periphery of the collar 22, and a number of smaller ribs between the larger ribs. Optionally, the outer surface could be configured to engage a tool, such as a square or hexagonal shape to allow the use of a wrench.

The distal end 60 of the collar 22 is the end most distant from the flange 32 during use. The distal end of the collar 22 has an opening sized so the lip 42 can pass through the opening, especially if the distal end of the lip 42 is rounded, and with the lip engaging the distal end of the collar to prevent the collar from disengaging from the tubular insert 20. This retention aspect is optional.

The proximal end of the collar 22 closest to the flange 32 is sized and configured to fit inward of the posts 46, walls 48 and latch 50. An inclined wall or latching ramp 62 is located adjacent the proximal end on an outer surface of the collar 22. The latching ramp 62 is located and oriented so that it abuts the latch 50, preferably the inner face 56, and urges the latch outward as the ramp 62 moves along the longitudinal axis 28. Thus, in the depicted embodiment the latching ramp 62 is on an outer surface of collar 22 and extends toward the flange 32 and has its narrowest portion closer to the flange 32. The latching ramp 62 is optional.

A second skirt ramp 64 (FIGS. 4, 14) is located on an inward facing portion of the collar 22. In the depicted embodiment the second skirt ramp 64 is located between the end of the threads 40b and the distal end 60 of the collar. The second skirt ramp 64 is inclined toward the longitudinal axis 28 and toward the tubular insert 20. The first and second ramps 44, 64 are located to abut each other, and oriented relative to each other so that longitudinal movement of the ramps along the longitudinal axis 28 causes the flexible skirt members 38 to move inward toward the longitudinal axis 28.

Figure 6:
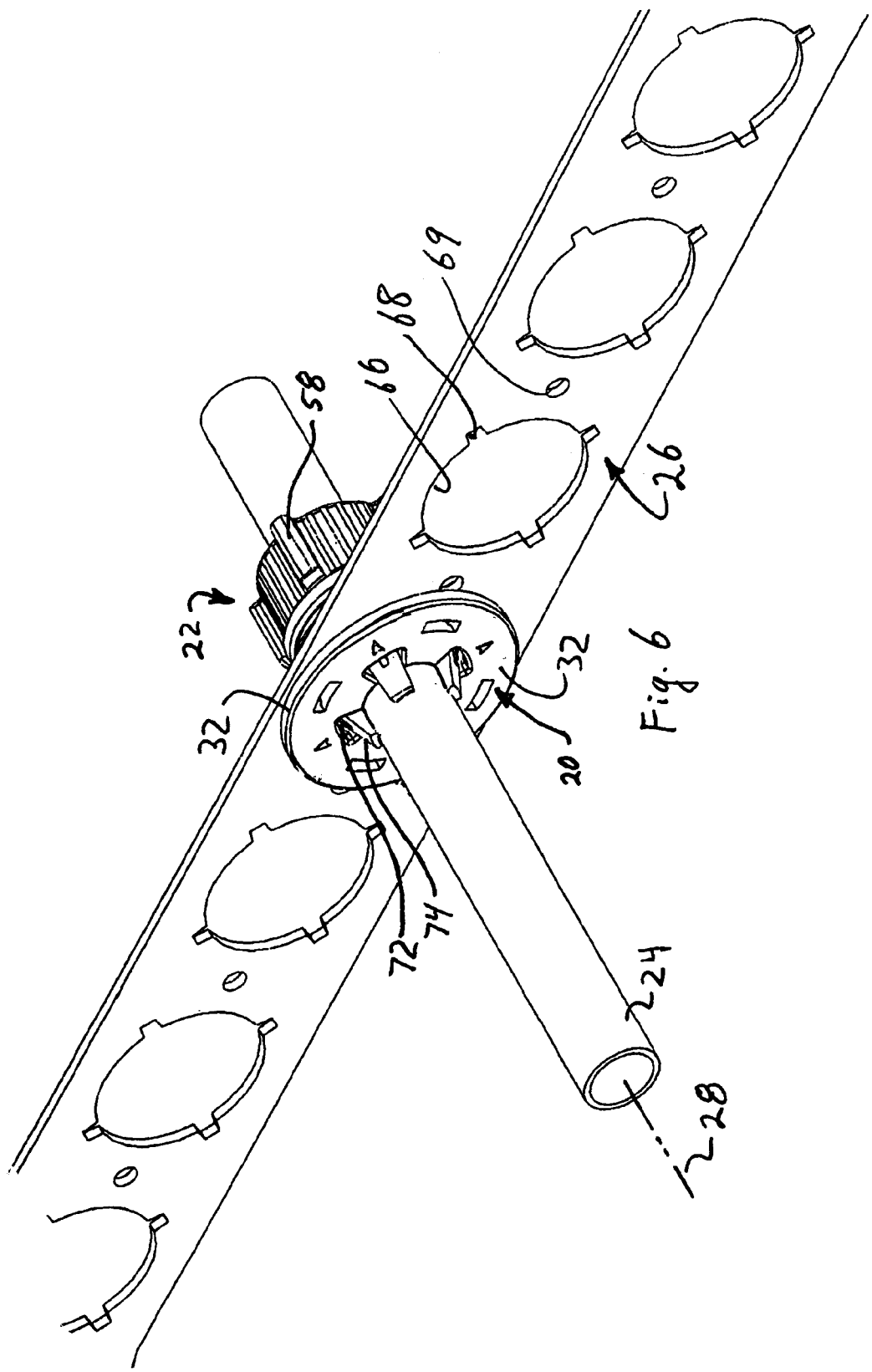
FIG. 6 is a perspective view showing the assembly of FIG. 5, but from an opposing angle.
Figure 7:
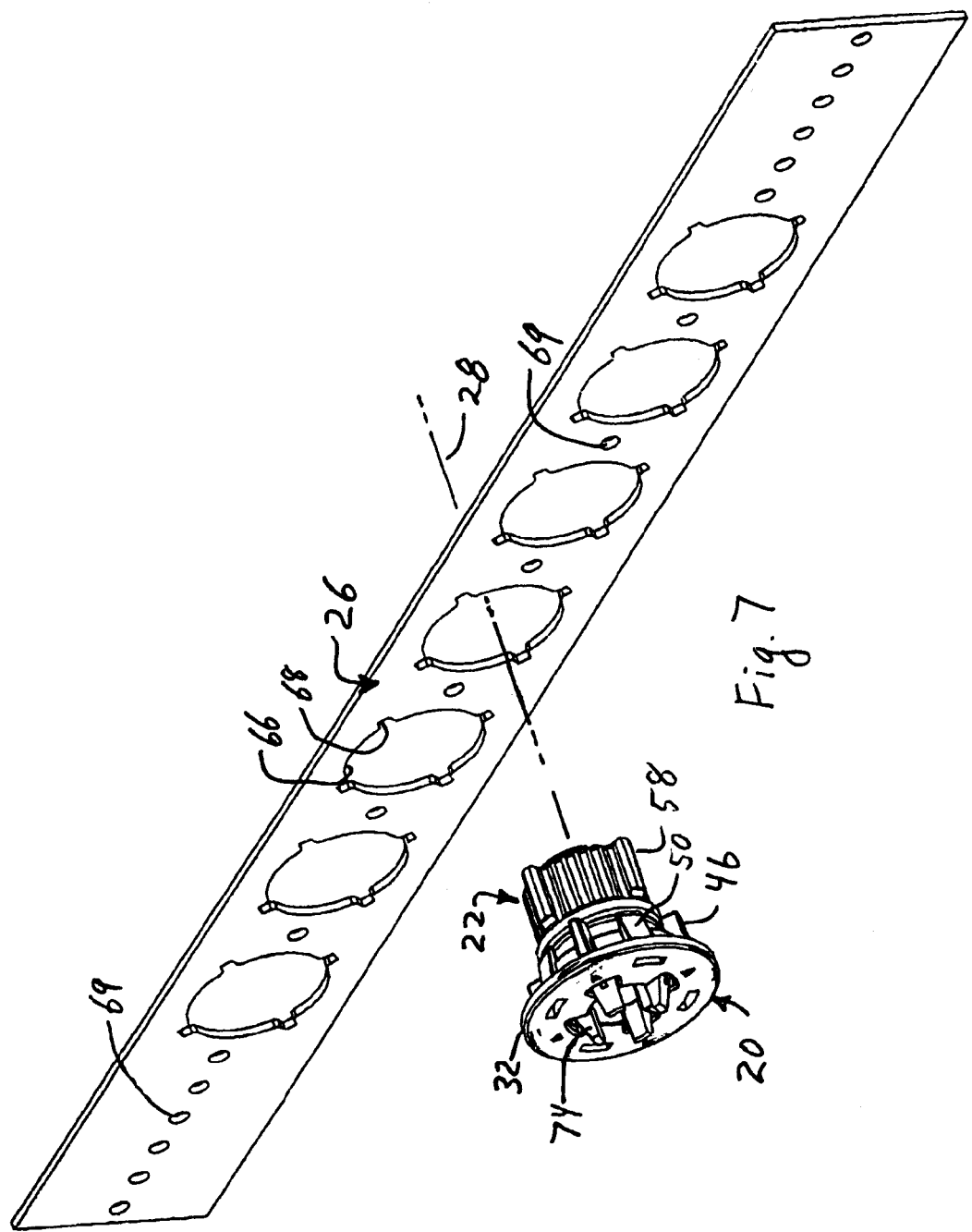
FIG. 7 is a perspective view of the tubular insert and collar aligned for insertion in an opening in a strap.
Figure 8:
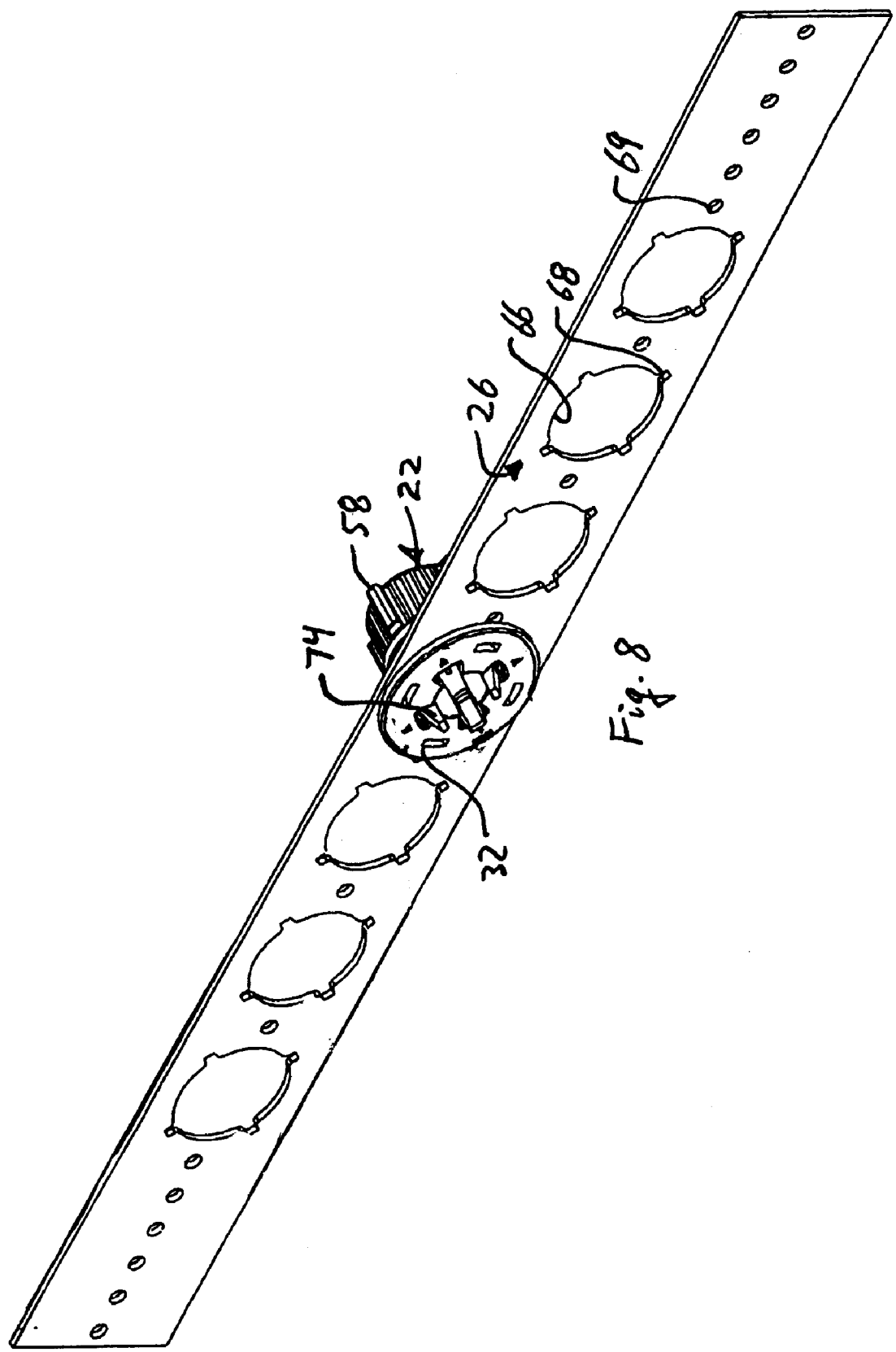
FIG. 8 is a perspective view of the tubular insert and collar of FIG. 7 inserted into the opening of the strap.

Referring to FIG. 6, the strap 26 is an elongated piece of material, preferably a thin strap made of metal or wood or plastic. The strap 26 has at least one hole 66, and preferably a plurality of holes 66 of similar configuration. The hole 66 preferably, but optionally, has at least one cut-out or slot 68 extending outward from the edge of the hole but not extending to the edge of the strap. Four slots 68 are showing, equally spaced about the circumference of the hole 66. The number of slots can vary, but preferably correspond to the number of posts 46, and vice versa. The holes 66 are preferably spaced apart distances corresponding to the standard pipe spacing for attachment to faucets, or other plumbing fixtures. Smaller holes 69 are provided in the strap 26 to allow fasteners to pass through the strap and fasten it to studs or other supports in a building. The strap 26 is preferably, but optionally, long enough to span at least two building studs.

Instead of a strap, the hole(s) 66 could be made in an L-shaped bracket or a bracket of other shape as described or shown in U.S. Pat. No. 6,158,066, the complete contents of which is incorporated herein by reference. Indeed, given the present disclosure one skilled in the art could modify the connector of that prior patent to contain the features described in the present disclosure.

Referring further to FIGS. 4-9, the strap 26 is fastened to a building, typically by passing fasteners such as nails or screws through fastener holes 69. The collar 22 is placed on the tubular insert 20 and passed through the hole 66 in strap 26 corresponding to the desired location of the pipe 24. Alternatively, the strap 26 and/or tubular insert 20 and collar 22 can be positioned relative to a preexisting pipe location.

The posts 46 are aligned with the slots 68 to allow passage of the tubular insert through the hole 66, with the posts passing through the cut-outs or slots 66. As the tubular insert 20 passes through the hole 66, the flange 32 abuts the strap to limit motion of the tubular insert along the longitudinal axis 28. The latches 50 move inward to pass through the hole 66, and move outward after the barb 54 passes through the hole so the barb 54 engages the side of the strap 26 opposite the flange 32 to restrict motion of the tubular insert along the axis 28. The posts 46 engage the cut-outs or slots 68 to restrain rotation of the tubular insert 20 in the plane of the strap 26 and about longitudinal axis 28.

The collar 22 is preferably small enough to fit through the hole 68, but if not, the collar can be placed on the tubular insert after the tubular insert is passed through the hole 66 in the strap 26. The pipe 24 is passed through the tubular insert 20 and collar 22 either after the tubular insert is fastened to the strap, or before.

Referring to FIG. 4, the collar 22 may optionally spin freely around the skirt before the threads 40a, 40b engage, preferably with the lip 50 retaining the collar on the tubular insert. The collar 22 is urged toward the flange and rotated so the engaging threads 40a, 40b cause the collar to move along longitudinal axis 28 toward the strap 26 and flange 32. The first and second ramps 44, 64 abut each other and force the flexible skirt members 38 inward against the pipe 24. Rotation of the collar 22 thus causes the tubular insert 20 to grip the pipe 24 to restrain axial movement of the pipe along its longitudinal axis 28 and rotational movement of the pipe 24 relative to tubular insert 20. Loosening or unscrewing the collar 22 moves the ramps 44, 64 apart and loosens the skirt clamping of the pipe 24 so the pipe 24 can move along the longitudinal axis 28 or be rotated relative to the strap or tubular insert.

Further, as the collar 22 moves toward the flange 32 and strap 26, the latching collar 62 on the collar abuts the latches 50, preferably the inner wall 56, causing the latches 50 to bend outward away from the longitudinal axis 28 and toward the edges of the hole 66 in strap 26. This effectively expands the interference of the tubular insert 20 within the hole 66 and more firmly clamps the mating parts together. Preferably, the proximal end of the latches 50 on the flange 32 bend so the barb 54 engages more of the abutting face of the strap 26.

When the collar 22 is unscrewed and the latching ramp 62 disengaged from the distal ends of latches 50, the latches preferably remain engaged with the strap 26. But the latches 50 preferably form lever springs that are hinged at the flange 32, so the distal ends of the latches 50 can be manually moved inward toward axis 28 to disengage the barb 54 from the strap 26 and to allow the tubular insert to be withdrawn from the hole 66 and strap 26. The collar 22 may be removed so that a person's fingers can manually engage the distal ends of the latches 50 and move them inward to disengage the latching surfaces from engagement with the edges of the holes through the strap 26.

In use, the collar 22 is placed on the tubular insert 20 until the lip 42 snaps over the distal end 60 to releasably hold the parts together, and to allow the collar to rotate on the tubular insert 20. Moving the flexible skirt members 38 inward can release the lip 42 from engaging and restraining collar 22 so the parts can be separated. The assembled tubular insert 20 and collar 22 are passed through the hole 66 in strap 26 after being aligned so the posts 46 pass through the mating cut-outs or slots 48. Upon insertion the flange 32 abuts strap 26 to prevent the tubular insert from passing through the strap. The walls 48 and the base of the latches 50 adjacent the flange 32 are preferably located to conform to the shape of the hole 66 and to snugly fit in the hole to provide a large area of contact between the strap 26 and tubular insert 20. Thus, in the depicted embodiment with a generally circular hole 66 the walls 48, latches 50 and posts 46 are arranged in a circle.

During insertion the ramped surface 52 on the latches 50 cause the latches to bend inward and pass through the hole 66 and the latches 50 then resiliently urge the engaging surfaces such as barbs 54 outward to engages the edges of the opening 66 and the side of the strap 26 opposite the flange 32 in order to prevent removal of the tubular insert 20 from the hole 66 and strap 26. The pipe 24 is placed through the tubular insert 20 and collar 22 before or after the tubular insert is fastened to the strap 26. The collar 22 can be placed on the tubular insert 20 before or after the tubular insert is fastened to the strap 26. The ribs 58 on the collar 22 make it easy to manually tighten the collar 20 so the ramps 44, 64 abut to move the flexible skirt members 38 of skirt 30 inward and thus grip the pipe 24 to restrain axial and rotational motion of the pipe. As the collar 22 is rotated and tightened the proximal end of the collar 22 moves into the annular space between the base 31 and the encircling posts 46, walls 48 and latches 52 and which limit movement in one direction along the longitudinal axis and also limit outward movement of the perimeter of the proximal end of the collar 22 and provide support for the collar to push inward against the resilient members 38, 74. The latching ramp 62 on the collar abuts the latches 50 and urges the latches outward against the edges of the hole 66 in strap 26 to further secure the connection between the tubular insert 20 and strap 26. The end of the collar 22 placed between the latches 50 and base 31 prevent the latches from moving inward toward the longitudinal axis so that the barbs 54 can disengage from the strap 26. The collar 22, and especially the latching ramp 62 thus provides locking means to lock the latches 50 into engagement with the strap 26.

The process can be reversed to release and either adjust or disassemble the parts. The collar 22 can be unscrewed to release the latches 50, skirt members 38 and pipe 24 so the pipe can be adjustably positioned or removed. After unscrewing the collar 22, the latches 50 can be manually moved inward to release the barb 54 from the strap 26 and allow removal of the tubular insert 20 from the strap 26. The latches 50 advantageously securely engage the sides of the hole 66 so that manual force is required to move the latches inward and disengage the barb 54 from the strap 26. Preferably, but optionally, the latches 50 may be prevented by the proximity of the latching rim 62 from moving inward to disengage the barb 54 from the strap 26 unless the pipe 24 is removed. After the pipe 24 is removed, then the flexible skirt members 38 can be manually moved inward to remove the collar from the tubular insert.

Referring to FIGS. 4 and 12-14, the tubular insert 20 can be further improved to increase the clamping of the pipe 24. The base 31 is segmented by a plurality of slits 70 that extend parallel to the longitudinal axis 28 with a distal end of the slits terminating in the distal end of base 31, adjacent threads 40a and the proximal end extending through the flange 32. An intermittent, circumferential slot 72 extends between two adjacent slits 70 to separate the outside of parts of the base 31 from the flange 32. The slits 70 and slots 72 form rectangular-shaped, elongated base members 74 which are inwardly movable adjacent the flange 32 and connected to the distal end of base 31 toward the threads 40a. The circumferential slot 72 is intermittent so that the flexible base members 74 alternate with segments where the base and flange are uncut and continuous in order to provide sufficient structural support to the base 31 and skirt 30. Thus, flexible base members 74 alternate with integrally joined portions of the base 31 and flange 32.

One or more base ramps 76 are located on the outer side of the flexible base members 74. The portion of the base ramps 76 adjacent the flange 32 are further from the longitudinal axis, and the ramp tapers toward the distal end of the base 31 and toward the longitudinal axis 28.

Figure 2:
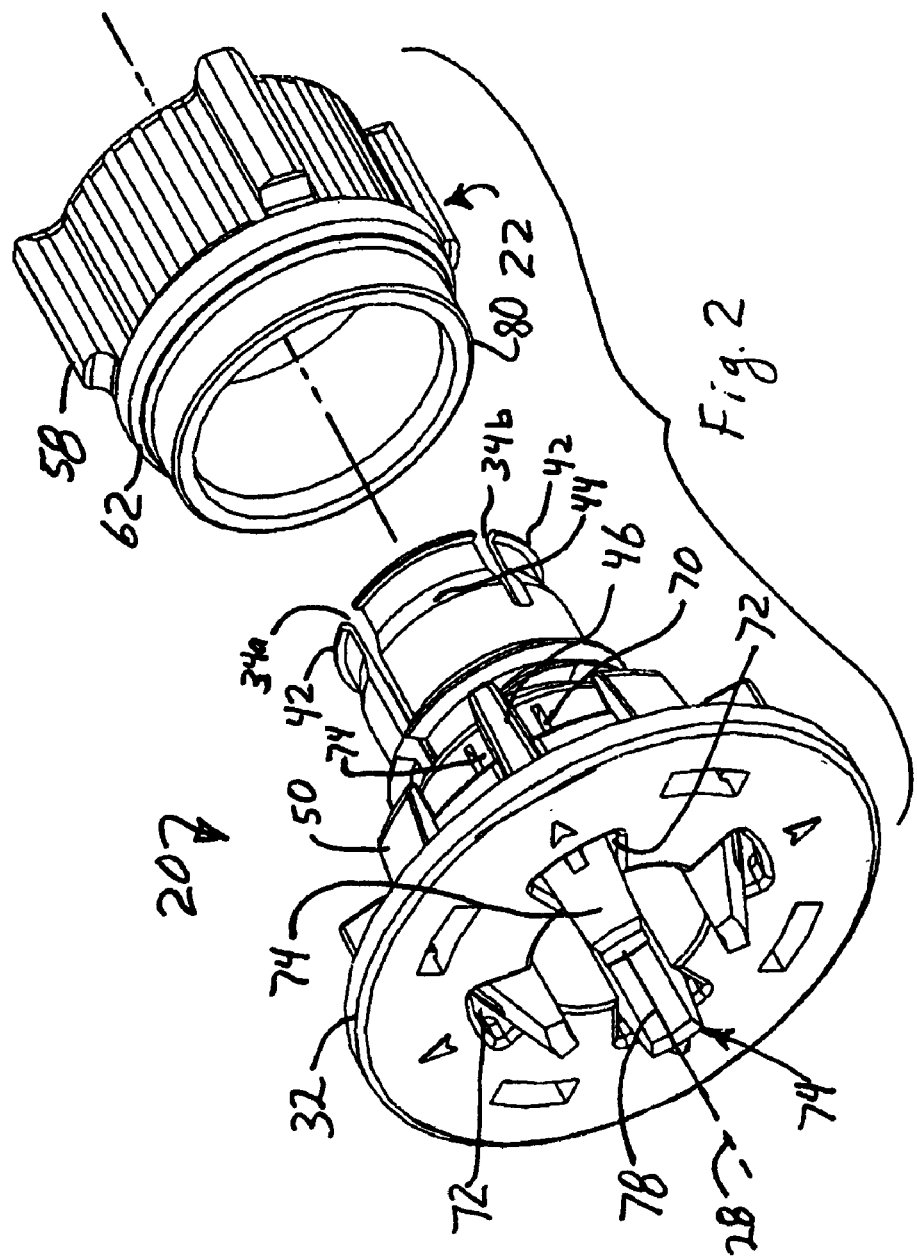
FIG. 2 is an exploded perspective of the parts of FIG. 1 from an opposing angle.
Figure 3:
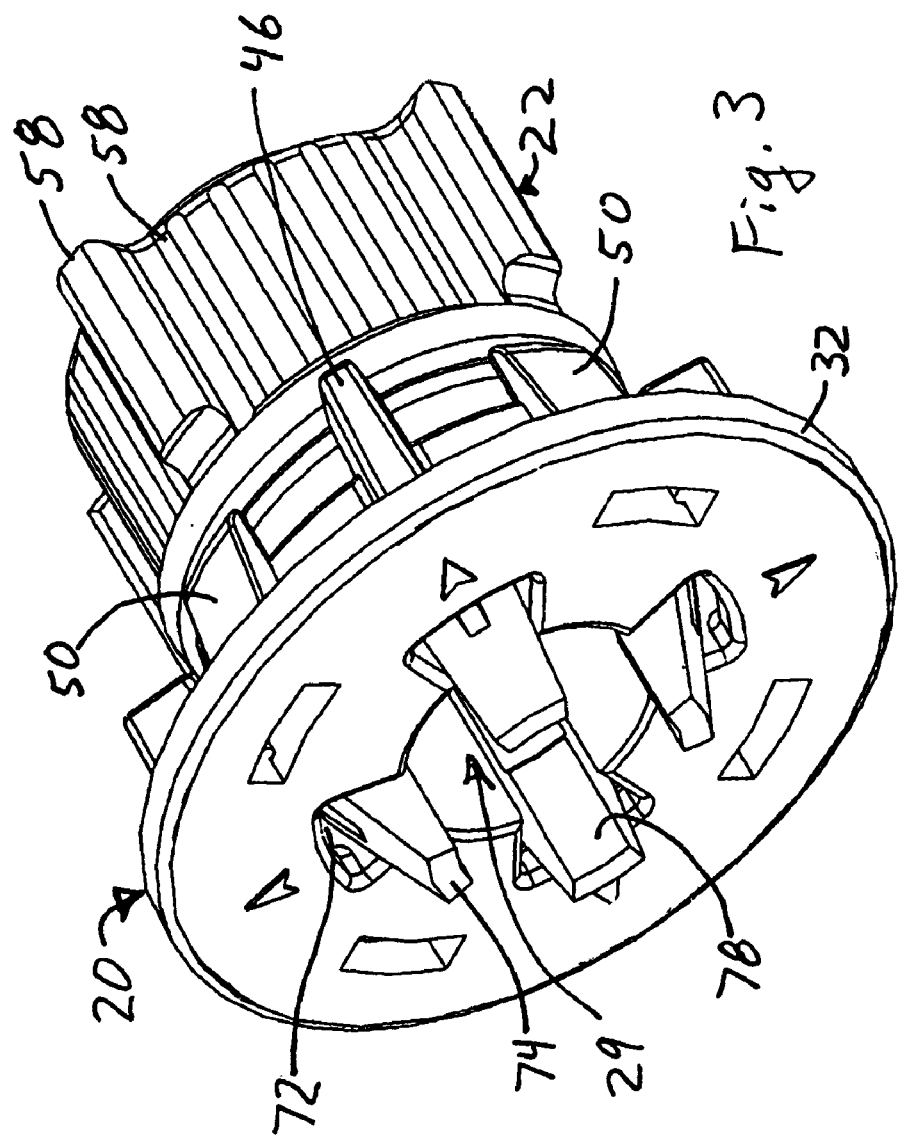
FIG. 3 is a perspective view of the tubular insert and collar in an assembled configuration.

Referring additionally to FIG. 2, the slots 72 in the flange 32 preferably encircle any portion of the flexible base member 74 that extends through or beyond the flange 32 in order to allow movement of the members 74. Thus, when the flexible base members 74 extend through the flange, the slot 74 is more accurately described as an opening shaped to conform to the shape of the adjacent portion of the member 74 and further shaped to allow movement of that member 74. For this reason, the slot 72 will be referred to hereinafter as slot/opening 72 or opening 72

As the proximal end of the collar 22 is forced into the space between the base 31 and the structural ring formed by the posts 46, walls 48 and latches 50, the collar will abut base ramps 76 and force the base members 74 inward against the pipe 24. The base members 74 thus further grip the pipe 24 and further restrain axial and rotational movement. Preferably the proximal end of the collar 22 is slightly tapered to provide an inclined surface or ramp 80 (FIG. 2, 14) to abut the base ramps 76. But various shapes could be used on these abutting parts to cause the inward movement that grips the pipe, and the location of the abutting parts could be changed.

The proximal end of the flexible base members 74 optionally have a contact pad 78 extending inward in order to define a more discrete contact area with the pipe 24 during use. Further, the proximal ends of the flexible base members 74 are shown as extending beyond the plane of the flange 32. During use, drywall abuts the flange 32 and the proximal ends of members 74 that extend beyond the flange 32 advantageously do not extend so far that they exceed the thickness of the drywall. The drywall thickness varies from about 0.5 to 0.75 inches, so the protrusion of the ends of members 74 is preferably less than that. The hole in the drywall to accommodate pipe 26 is typically large enough so the drywall does not hit the ends of the members 74.

Figure 9:
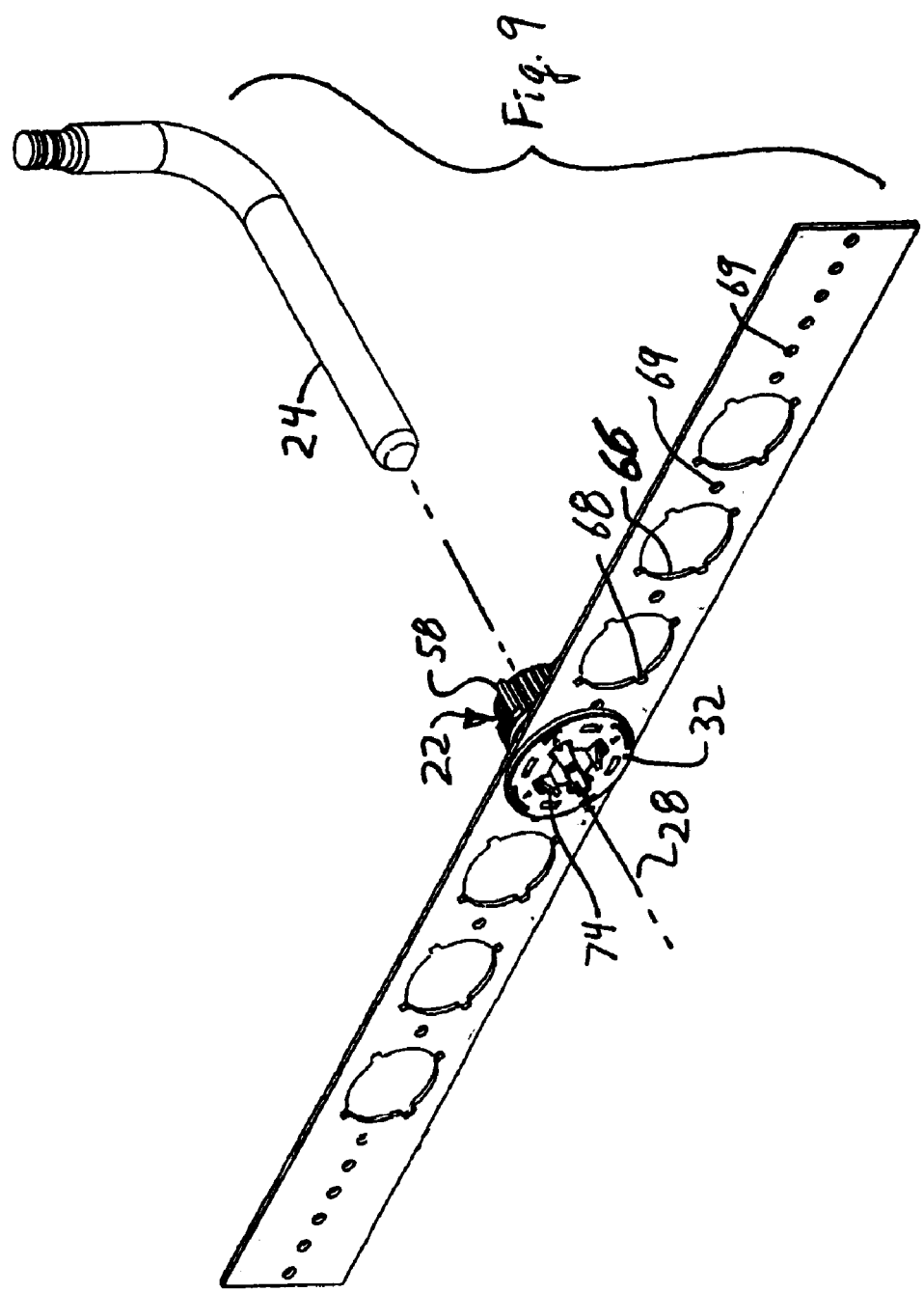
FIG. 9 is a perspective view of the assembly of FIG. 8 aligned for receiving a pipe with an elbow.
Figure 10:
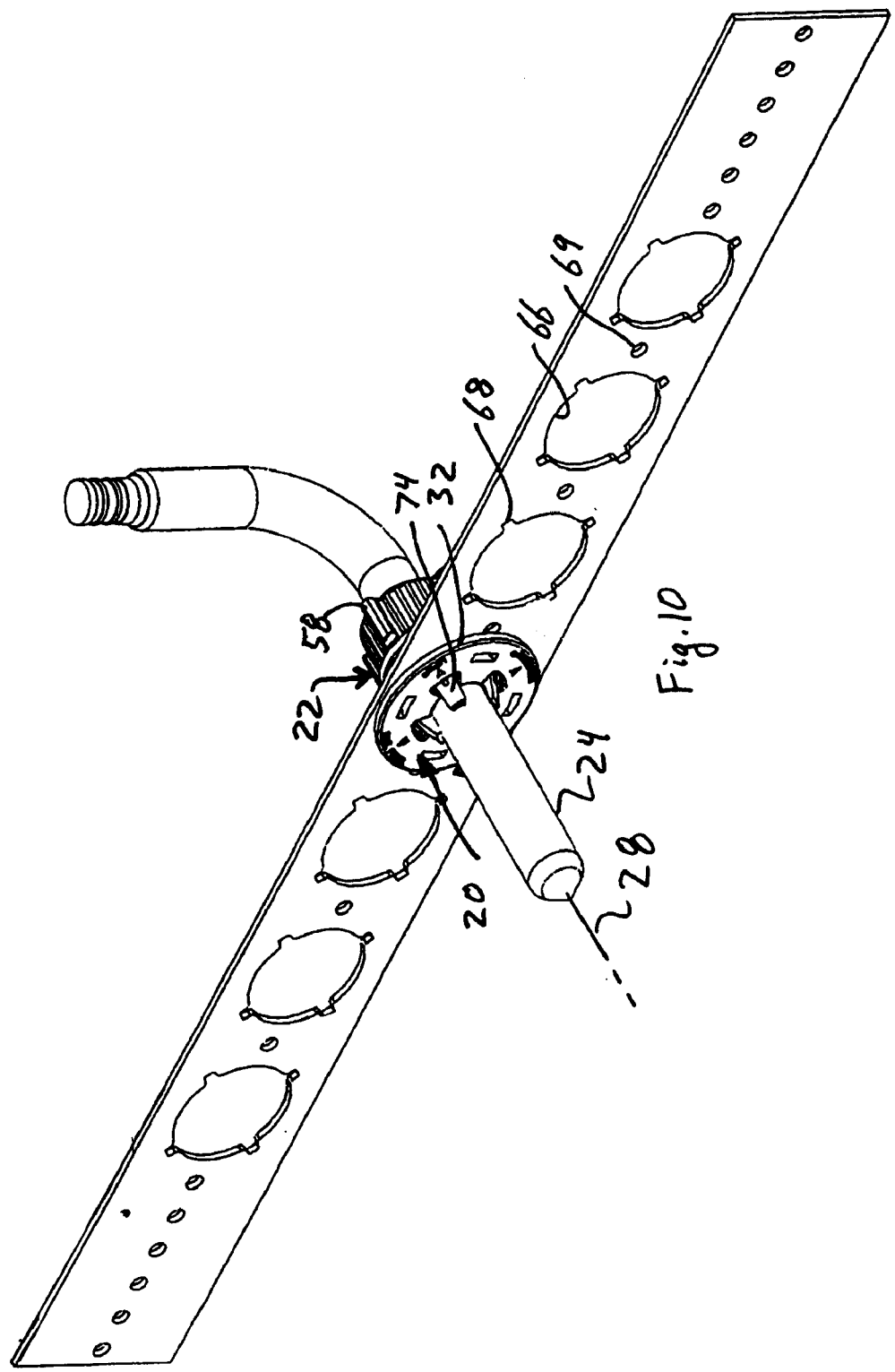
FIG. 10 is a perspective view of the parts of FIG. 9 in an assembled configuration.

The protrusion beyond the flange 32 allows the contact pad 78 to be positioned further away from the flexible skirt members 38 in order to provide a wider base of support for the pipe 24 and thus a more stable support. As seen in FIGS. 9-11, in use, there is often an elbow adjacent the distal end of the tubular insert 20 and collar 22 and the elbow radius combined with the limited depth inside the building wall limits the allowable length of the parts and thus limits the distance between the contact pad 78 and the contact with the flexible skirt members 38. Extending the contact pads 78 beyond the flange 32 helps lengthen the support base for the pipe and provide a more sturdy support.

The distal end of the base 31 and the proximal end of the skirt 30 thus form a support structure for flexible skirt members 38 and flexible base members 74, with the flexible base members 74 extending toward the flange 32 and the flexible skirt members 34 extending away from the flange, but both flexing inward toward the pipe 24 and axis 28 to grip the pipe—albeit at spaced apart locations. Indeed, preferably the skirt members 34 contact the pipe on one side of the flange 32 (and distant therefrom) while the base members 74 contact the pipe at the flange or on the side of the flange opposite the location of the skirt members 34. The flexible skirt members 34 could be used without the flexible base members 74. The flexible base members 74 could be used without the flexible skirt members 38. Preferably both are used and are spaced as far apart as practical in order to provide a broader support and more stability to the pipe 24. Further, the angular relationship of the flexible base member 74 and flexible skirt members 38 could vary from that illustrated.

The tubular insert 22 thus has flexible skirt members 38 and flexible base members 74, extending in opposing directions parallel to the longitudinal axis 28, with the skirt members 38 and base members 74 releasably forced into varying degrees of engagement with the pipe by controlled movement of the collar 22. The location and angles of inclination of the abutting surfaces on the flexible skirt and base members 38, 74 and the collar 22 are selected so the parts engage the pipe substantially at the same time.

The flexible skirt and base members 38, 74 are typically curved segments because the base and tubular insert are curved, but they need not be curved, and the parts that abut the pipe 24 can be of any desired configuration. Preferably though, the abutting portions are configured to have the same shape as the surface of the pipe which they abut. Thus, the contact pad 78 has the general shape of a portion of a recessed, elongated cylinder.

The tubular insert 20 and collar 22 are each preferably integrally molded of polymer, preferably of polymers including Nylon or polypropylene, with or without reinforcing components. Figures showing the flange 32 (e.g., 3 and 12) show four generally rectangular slots spaced below and outward of the latches and these slots allow a molding portion to be inserted through the slot to form the step or barb 54.

The skirt 30 and one or both of the inclined ramps 44, 64 thus provide means for gripping the pipe and restraining axial and rotational movement of the pipe 24 along its axis 28. These means may also include the base members 74 and associated abutting surfaces such as ramp 76 and 80. Note that one or both of the paired ramps 44, 64 or 76 and 80 need not be inclined as other mating shapes could be used to move the flexible skirt members 38 inward, such as a ramp on one part and a square or rounded corner moving parallel to axis 28 on the other part, or a stop hitting a lever or raised projection on the flexible member 38, 74. But a good mechanical advantage is achieved if both ramps 44, 64 and both ramps 76, 80 are inclined.

The latching ramp 62 and latches 50 provide means for releasably locking the tubular insert to the strap, preferably by moving the latches 50 outward. The latches 50 could take various forms, with the leaf spring being configured, and with the barb 54 being optional.

The posts 46 cooperate with the cut-outs or slots 68 to provide means for restraining rotation of the tubular insert 20 in the plane of the hole 66 and strap 26. While generally rectangular slots 68 extending radially outward from axis 28, and correspondingly shaped posts 46 are shown, the shapes of these parts can vary—but are preferably shaped to mate snugly. Posts 46 with circular or curved peripheries mating with curved cut-outs 68 are also believed preferable.

The above description is given by way of example, and not limitation. Given the above disclosure, one skilled in the art could devise variations that are within the scope and spirit of the invention disclosed herein, including various ways of locating the mating surfaces. Thus, for example, the ramping surfaces 44, 64, 76, 80 could be located elsewhere, although the ramps are preferably located near or at opposing ends of tubular insert 20. The walls 48, posts 46 and latches 50 are arranged in a circle to mate with circular hole 66, but other shapes could be used, for example, a square or rectangular hole and square or rectangularly arranged insert. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A pipe support for use with a support member having first and second opposing sides and an opening in the support member through which the pipe extends during use, the pipe support comprising:

a tubular insert extending along a longitudinal axis and sized to snugly fit over the pipe during use so the longitudinal axis of the tubular insert coincides with a longitudinal axis of the pipe, the tubular insert comprising:

a flange extending outwardly from a base end of the tubular insert and a skirt at the end opposite the base end of the tubular insert, the skirt ending in a lip at a distal end of the skirt portion with a plurality of slits extending though the lip and at least a portion of the skirt to form resilient skirt members that can be moved toward the longitudinal axis, external threads on at least one of the base and skirt; and a plurality of resilient latches extending from the flange substantially parallel to the longitudinal axis and located outward of the base a predetermined distance, the latches having an outwardly facing latching surface and located to fit through the opening in the support member so the flange and latching surface abut opposing sides of the support member during use of the tubular insert, each resilient latch having an inward facing abutting surface;

a collar having internal collar threads located to threadingly engage the threads on the tubular insert, the collar and skirt having mating surfaces located to abut one another to move the resilient skirt members inward toward the pipe as the collar moves toward the flange of the tubular insert during use of the tubular insert, the collar having an outwardly facing abutting surface located and configured to abut the inward facing abutting surfaces on the resilient latches to move the resilient latches outward as the collar moves toward the flange and between the resilient latches and the base during use of the tubular insert.

2. The pipe support of claim 1, wherein the mating surfaces on the collar and skirt comprises an outwardly facing inclined surface on the skirt and an inwardly facing inclined surface on the collar.

3. The pipe support of claim 2, wherein the outwardly facing abutting surface on the collar comprise an annular surface inclined toward the longitudinal axis and toward the flange during use.

4. The pipe support of claim 1, wherein the outwardly facing abutting surface on the collar comprise an annular surface inclined toward the longitudinal axis and toward the flange during use.

5. The pipe support of claim 1, wherein the lip comprises an outwardly extending flange and the collar and tubular insert are configured so the flange on the lip extends over a mating portion of the collar to restrain removal of the collar from the tubular insert.

6. The pipe support of claim 1, wherein the slits in the skirt are of different length.

7. The pipe support of claim 6, further comprising:

a plurality of slits along a length of the base and slots at the juncture of the base and flange to define a plurality of resilient base members between adjacent slits which base members can move inward and to further define a plurality of stationary base members between adjacent slots that connect the base to the flange and that do not resiliently move inward;

an inclined outer surface on an at last a plurality of the resilient base members; and an inclined annular surface on the inside of the collar sized and located to abut the inclined outer surfaces on the resilient base members to move the resilient base members inward as the collar moves toward the flange of the tubular insert and over the base and inclined outer surface.

8. The pipe support of claim 7, further comprising one of walls or posts extending from the flange along axes substantially parallel to the longitudinal axis and spaced outward from the base a distance corresponding to a thickness of an end of the collar.

9. The pipe support of claim 1, further comprising a plurality of posts spaced outwardly of the base and extending from the flange along an axis generally parallel to the longitudinal axis.

10. The pipe support of claim 1, further comprising slits extending through the base and slots extending through the flange to define a plurality of resilient base members between adjacent slits which base members can move resiliently inward toward the longitudinal axis, the slits in the base further defining a plurality of stationary base members between adjacent slits, which stationary base members that connect to the flange and that do not resiliently move toward the longitudinal axis, and wherein the collar and base having mating surfaces located to abut one another to move the resilient base members toward the longitudinal axis as the collar moves over the base and toward the flange of the tubular insert.

11. The pipe support of claim 1, further comprising:

a plurality of slits along a length of the base and slots at the juncture of the base and flange to define a plurality of resilient base members between adjacent slits which base members can move inward and to further define a plurality of stationary base members between adjacent slots that connect the base to the flange and that do not resiliently move inward;

an inclined outer surface on at least a plurality of the resilient base members; and an inclined annular surface on the inside of the collar sized and located to abut the inclined outer surfaces on the resilient base members to move the resilient base members inward as the collar moves toward the flange of the tubular insert and over the base and inclined outer surface.

12. The pipe support of claim 11, wherein the inclined outer surface comprises two inclined ramps parallel to each other and spaced apart from each other, on a plurality of the resilient base members.

13. The pipe support of claim 1, further comprising slits in the base generally parallel to the longitudinal axis and slots between the base and flange, which slits and slots define a plurality of resilient base members between adjacent slits so the resilient base members can move toward the longitudinal axis, and to further define a plurality of stationary base members between adjacent slots that connect to the flange and that do not resiliently move toward the longitudinal axis, the slots in the flange forming openings through which the resilient base members extend so that an end of each resilient base member is located on a side of the flange opposite to the skirt, the collar and base having mating surfaces located to abut one another to move the resilient base members toward the longitudinal axis as the collar moves toward the flange of the tubular insert.

14. A pipe support for use with a support member having first and second opposing sides and an opening in the support member through which the pipe extends during use, the pipe support comprising:

an tubular insert having a tubular base and skirt extending along a longitudinal axis with a flange extending outward from the base, the base and skirt configured to extend through the hole in the support member during use of the tubular insert with the flange preventing passage of the tubular insert through the hole during use, the pipe passing through the inside of the tubular insert during use, the skirt having a plurality of slits extending away from the base to form a plurality of resilient skirt members having free ends that can bend toward the longitudinal axis during use, the base having a plurality of slits extending toward the flange and a plurality of slots between the flange and base and adjacent slits to define a plurality of elongated resilient base members between adjacent slits, the base having slots in the flange located to separate the resilient members from the flange so that a free end of the resilient base members can move toward the longitudinal axis during use, the flange connected to the base between slots but not directly connecting to the portions of the base forming the resilient base members;

an inclined surface on each of the resilient skirt members and resilient base members with the inclined surfaces increasing in distance from the longitudinal axis as the inclined surface approaches the flange;

a collar configured to fit over the skirt and base, the collar having a first surface located on an inside of the collar to abut one of the inclined surfaces on the base and force the resilient base member inward toward the longitudinal axis, the collar having a second surface located on an inside of the collar to abut one of the inclined surfaces on the skirt and force the resilient skirt member inward toward the longitudinal axis.

15. The pipe support of claim 14, wherein the first and second surfaces on the collar comprise an annular surface extending around an inner circumference of the collar.

16. The pipe support of claim 14, wherein the resilient base members extend past the flange and have an end located on a side of the flange opposite the skirt, the end of the base members having a raised contact portion facing the pipe during use.

17. The pipe support of claim 14, wherein the base and skirt are cylindrical with the base having a larger outer diameter than the skirt, the tubular insert having a portion with exterior threads, and wherein the collar has a portion with interior threads located to threadingly engage the exterior threads.

18. The pipe support of claim 14, further comprising a plurality of latch members extending from the flange along an axis parallel to the longitudinal axis and having an overhanging latching surface located to engage the second side of the support member when the first side abuts the flange during use of the tubular insert.

19. The pipe support of claim 18, wherein the opening in the support member has at least one slot extending radially outward from a circular hole, and wherein the tubular insert has at least one post extending from the flange along an axis generally parallel to the longitudinal axis and located and configured to fit into the at least one slot in the support member during use.

20. The pipe support of claim 14, wherein the slits in the skirt are not the same length.

21. The pipe support of claim 14, wherein the lip has an outwardly extending flange located to engage a surface on the collar to restrain removal of the collar from the tubular insert.

22. A pipe support for use with a support member having first and second opposing sides and an opening in the support member through which the pipe extends during use, the pipe support comprising:

a tubular insert with a lip at a first end and a flange adjacent an opposing second end of the tubular insert and external threads between the flange and lip, a first plurality of slits extending from the lip toward the threads to form a first plurality of resilient gripping members each with a free first end, a second plurality of slits extending from the second end toward the threads to form a second plurality of resilient gripping members extending toward the flange with a free second end on each of the second members, the flange connecting to the tubular insert between the second resilient members so the second resilient members alternate with connections of the flange to the tubular insert, the tubular insert being sized to fit through the opening in the support member during use with the pipe passing through the inside of the tubular insert during such use, but with the flange being too big to fit through the opening in the support member during use;

first and second inclined surfaces on each of the first and second resilient members, respectively, with the distance of the first and second inclined surfaces from the longitudinal axis increasing as the inclined surfaces approach the flange;

a collar configured to fit over the tubular insert, the collar having first and second annular surfaces each extending around a circumference of the collar, the first annular surface located to abut the first inclined surfaces and move the first resilient members toward the longitudinal axis as the collar move toward the flange, the second annular surface located to abut the second inclined surfaces and move the second resilient members toward the longitudinal axis as the collar move toward the flange.

23. The pipe support of claim 22, wherein the inclined surfaces are inclined to intersect with the longitudinal axis.

24. The pipe support of claim 22, wherein the first and second ends of the resilient members are located on opposing sides of the flange.

25. The pipe support of claim 22, further comprising a resilient latching member extending from the flange along a length of the tubular insert but spaced apart from the base a distance sufficient to allow the collar to fit between the resilient latching member and the base, the resilient latching member having an undercut latching surface located to engage a first side of the support adjacent the opening during use when the flange abuts the second side of the support adjacent the opening during use.

26. The pipe support of claim 25, wherein the opening in the support member has at least one slot extending radially outward from a circular opening, and wherein the tubular insert further comprises at least one post extending from the flange along a length of the tubular insert but spaced apart from the base a distance sufficient to allow the collar to fit between the post and the base, the post sized to fit into the at least one slot in the support member during use.

27. The pipe support of claim 25, further comprising two wall segments extending from the flange and located on each side of the resilient latching member, the wall segments spaced apart a distance from the base sufficient to allow the collar to fit between the wall segments and the base.

28. A pipe support for use with a support member having first and second opposing sides and an opening in the support member through which the pipe extends during use, the support comprising:

a tubular insert sized to fit through the opening in the support member during use with the pipe passing through the inside of the tubular insert during use;

a collar fitting over the tubular insert;

means for gripping the pipe during use and restraining axial and rotational movement of the pipe along the longitudinal axis during use of the pipe support; and means for releasably locking the tubular insert to the support member during use of the tubular insert.

29. The pipe support of claim 28, further comprising means for restraining rotation of the tubular insert in the plane of the opening in the support member during use of the tubular insert.

* * * * *